United States Patent [19]
Cline et al.

[11] Patent Number: 5,874,957
[45] Date of Patent: Feb. 23, 1999

[54] METHOD AND APPARATUS FOR IMPROVED SCROLLING FUNCTIONALITY IN A GRAPHICAL USER INTERFACE UTILIZING A SOFTWARE TETHER

[75] Inventors: Troy Lee Cline, Cedar Park; Ricky Lee Poston, Austin, both of Tex.

[73] Assignee: International Business Machines Corporation, Armonk, N.Y.

[21] Appl. No.: 808,377

[22] Filed: Feb. 28, 1997

[51] Int. Cl.⁶ ........................................ G06F 3/00
[52] U.S. Cl. ............................. 345/339; 345/341
[58] Field of Search .................. 345/339, 340, 345/341, 342, 354, 345

[56] References Cited

U.S. PATENT DOCUMENTS

| | | | |
|---|---|---|---|
| 5,155,836 | 10/1992 | Jordan et al. | 395/500 |
| 5,283,560 | 2/1994 | Bartlett | 345/352 X |
| 5,313,229 | 5/1994 | Gilligan et al. | 345/123 X |
| 5,335,323 | 8/1994 | Kolnick | 345/340 |
| 5,339,391 | 8/1994 | Wroblewski et al. | 345/341 |
| 5,374,942 | 12/1994 | Gilligan et al. | 345/123 X |
| 5,404,442 | 4/1995 | Foster et al. | 345/348 |
| 5,481,741 | 1/1996 | McKaskle et al. | 345/349 X |
| 5,550,969 | 8/1996 | Torres et al. | 345/339 |
| 5,655,094 | 8/1997 | Cline et al. | 345/341 |

*Primary Examiner*—Raymond J. Bayerl
*Assistant Examiner*—Cao H. Nguyen
*Attorney, Agent, or Firm*—Richard A. Henkler; Melvin A. Hunn; Andrew J. Dillon

[57] ABSTRACT

A method and apparatus for scrolling functionality in a graphical user interface utilizing a software tether. Preferably, the invention is utilized in a data processing system which supports a graphical user interface which is utilized by the operator to create, modify, or review software objects. At least one particular work space is provided in the graphical user interface. A scroll bar activation function is provided which initiates scroll bar functionality after a predefined interaction of the graphical pointing device with said graphical user interface. The data processing system is utilized to monitor for interaction between the graphical pointing device and the graphical user interface, which satisfies the scroll bar activation function. After detection of satisfaction of the scroll bar activation function, the at least one scroll bar functionality is associated with the graphical pointing device. Then, a visually perceptible connection is generated which associates the at least one scroll bar functionality with the graphical pointing device in the graphical user interface.

11 Claims, 10 Drawing Sheets

METHOD AND APPARATUS FOR IMPROVED SCROLLING FUNCTIONALITY IN A GRAPHICAL USER INTERFACE UTILIZING A SOFTWARE TETHER

BACKGROUND OF THE INVENTION

1. Field of the Invention

The present invention relates in general to graphical user interfaces for data processing systems, and in particular to an improved scrolling function for graphical user interfaces.

2. Description of the Prior Art

Modern data processing systems allow operators to manipulate data at astounding rates; processing speeds of microprocessors in data processing systems have long ago ceased to be a major impediment to the speed and efficiency of most operator activities. Instead, cumbersome user interfaces have developed into a potentially serious impediment to efficient operator interaction with data processing systems. The operations of opening, positioning, sizing, and closing windows can place considerable strain on a user, particularly when complicated tasks are being performed or when the computer display screen is crowded with overlapping windows or work areas.

One other significant impediment to efficient use of data processing systems is that the windows or work spaces provided in most graphical user interfaces are relatively small in comparison to the software objects that are displayed therein. For example, most documents cannot be contained within a single work space. Likewise, most graphical or image files cannot be displayed in the work space of a graphical user interface. Accordingly, scrolling is frequently required in order to view all parts of the software object. Most graphical user interfaces for data processing systems include scroll bars which allow for vertical and horizontal scrolling, which effectively moves the software object upward or downward and leftward or rightward through the work space, and which provides an illusion of scrolling. Typically, scrolling is accomplished by utilizing a graphical pointing device to engage the vertical or horizontal scroll bar icon. Typically, the vertical scroll bar icon is located adjacent the work space, and includes a scroll bar track and a scroll bar slider member which is movable relative to the scroll bar track. The horizontal scroll bar is typically located at the bottom of the work space and likewise includes a scroll bar track and a scroll bar slider member which is movable relative to the scroll bar track. Typically, to initiate scrolling, the graphical pointing device must be located on the scroll bar icon, and the left mouse button must be depressed in a clicking operation which allows for a drag-and-drop manipulation of the scroll bar slider member relative to the scroll bar track or conventional dedicated "buttons" for scrolling movement must be activated. In some prior art graphical user inter-faces, the graphical pointing device may be removed from the scroll bar track, without interrupting the scroll bar functionality. In other words, the graphical pointing device may be moved away from the vertical or horizontal scroll bar track, and placed in the work space. In this position, clicking the mouse and moving the graphical pointing device upward within the work space causes upward scrolling, moving the mouse downward within the work space causes downward scrolling, moving the mouse leftward within the work space causes leftward scrolling, and moving the mouse rightward within the work space causes rightward scrolling.

One impediment with the prior art approach is that it is relatively easy for the operator to become disoriented or confused about his/her location within the software object when the graphical pointing device is located within the work space and utilized for scrolling operations.

SUMMARY OF THE INVENTION

It is one objective of the present invention to provide a method and apparatus for improved scrolling functionality in a graphical user interface which utilizes at least one software tether to provide a visually perceptible indication of location or position within a software object in the graphical user interface in order to provide the operator with immediate and visual feedback that he/she has successfully selected the scroll bar function for scrolling. Preferably, the tether is at least one relatively thin line which does not provide any substantial impediment to the visibility of the graphical user interface or the software objects displayed therein.

These and other objectives are achieved as is now described. The present invention is directed to a method and apparatus for improved scrolling functionality in a graphical user interface utilizing a software tether. Preferably, the invention is utilized in a data processing system which supports a graphical user interface which is utilized by the operator to create, modify, or review software objects. At least one particular work space is provided in the graphical user interface. A scroll bar activation function is provided which initiates scroll bar functionality after detection of a predefined user input, such as, for example, a predefined interaction of the graphical pointing device with the graphical user interface. The data processing system is utilized to monitor for interaction between the graphical pointing device and the graphical user interface. After detection of satisfaction of the scroll bar activation function, a visually perceptible connection is generated which associates the at least one scrolling function with the graphical pointing device in the graphical user interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
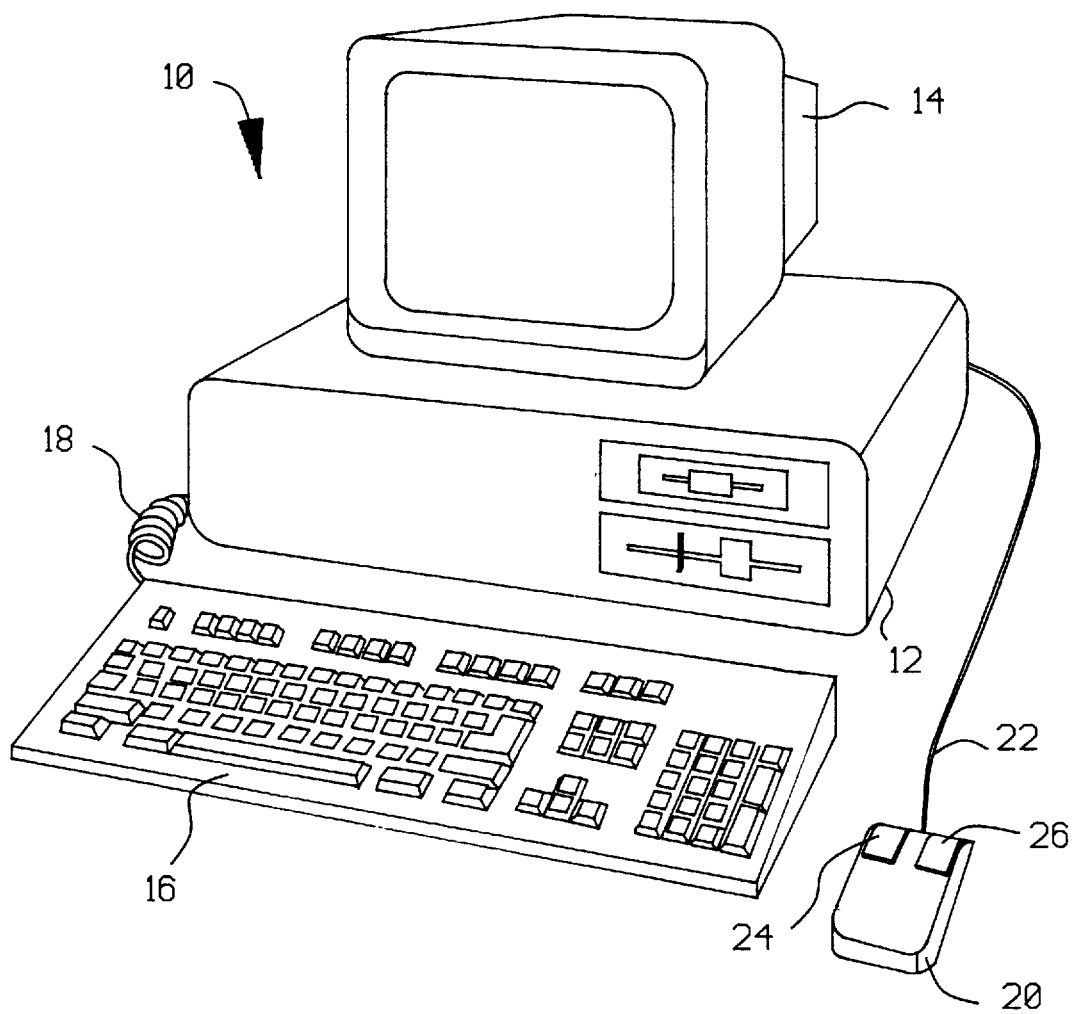
FIG. 1 is a pictorial representation of a data processing system which may be utilized to implement the method and apparatus of the present invention

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as those manufactured by International Business Machines Corporation.

Figure 2:
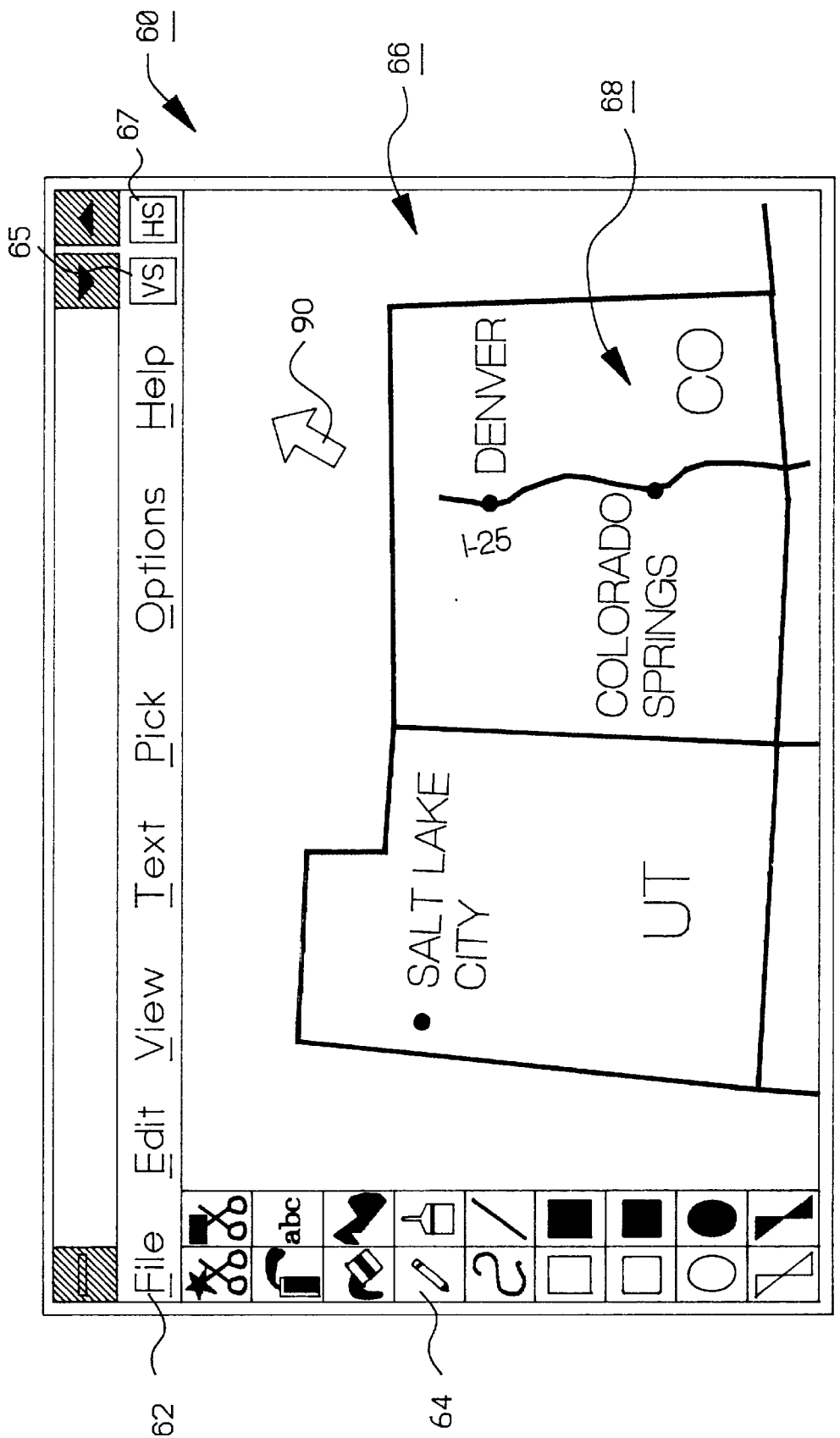
FIGS. 2 through 7B are pictorial representations of a graphic user interface which utilizes the method and apparatus for improved scrolling functionality of the present invention.

FIG. 2 depicts a graphical user interface 60 which may be displayed in video display 14 of data processing system 10 (of FIG. 1) and is only exemplary of one type of commercially available graphical user interface. The interface depicted in FIG. 2 is a graphical user interface from the "Paintbrush Program" of the Microsoft Windows Program 3.11. As is shown, the graphical user interface 60 includes textual commands 62 which may be selected through use of either the cursor or graphical pointing device 90, iconographic representations 64 of program functions which are available, and a workspace 66. Workspace 66 is utilized to create, modify, or review software objects which are composed of textual-components, graphical components, or a mixture of textual and graphical components. In FIG. 2, software object 68 is a map of the American Southwest which includes textual and graphical components. As is typical, software object 68 is much too large in size to be presented in its entirety within workspace 66. In order to bring other portions of software object 68 into view, scrolling operations may be performed in accordance with the present invention. As is conventional, graphic user interface 60 includes graphical pointing device 90 which may be utilized to manipulate the software objects and icons within the graphical user interface 60.

In accordance with the present invention, the data processing system 10 is programmed with a scroll bar activation function which initiates scroll bar functionality after detection of a predefined interaction of graphical pointing device 90 with graphical user interface 60. One example of a preferred interaction is the placement of graphical pointing device 90 over either or both of vertical scroll button 65 or horizontal scroll button 67 and concurrent clicking of one or more buttons on the mouse which is associated with graphical pointingdevice 90 in a predetermined manner. Any novel or conventional user input, including interaction between graphical pointing device 90 and graphical user interface 60, may be utilized to initiate the scroll bar activation function. One exemplary alternative would be to initiate a scroll bar functionality when there is detected interaction with a conventional scroll bar, such as interaction between the graphical pointing device 10 and any designated portion of a conventional scroll bar track and slider. In accordance with this alternative technique, graphic pointing device 90 is located over any predetermined portion of a vertical or horizontal scroll bar icon. Concurrent activation of one or more of the buttons on the mouse initiates the scroll bar functionality.

Figure 3:
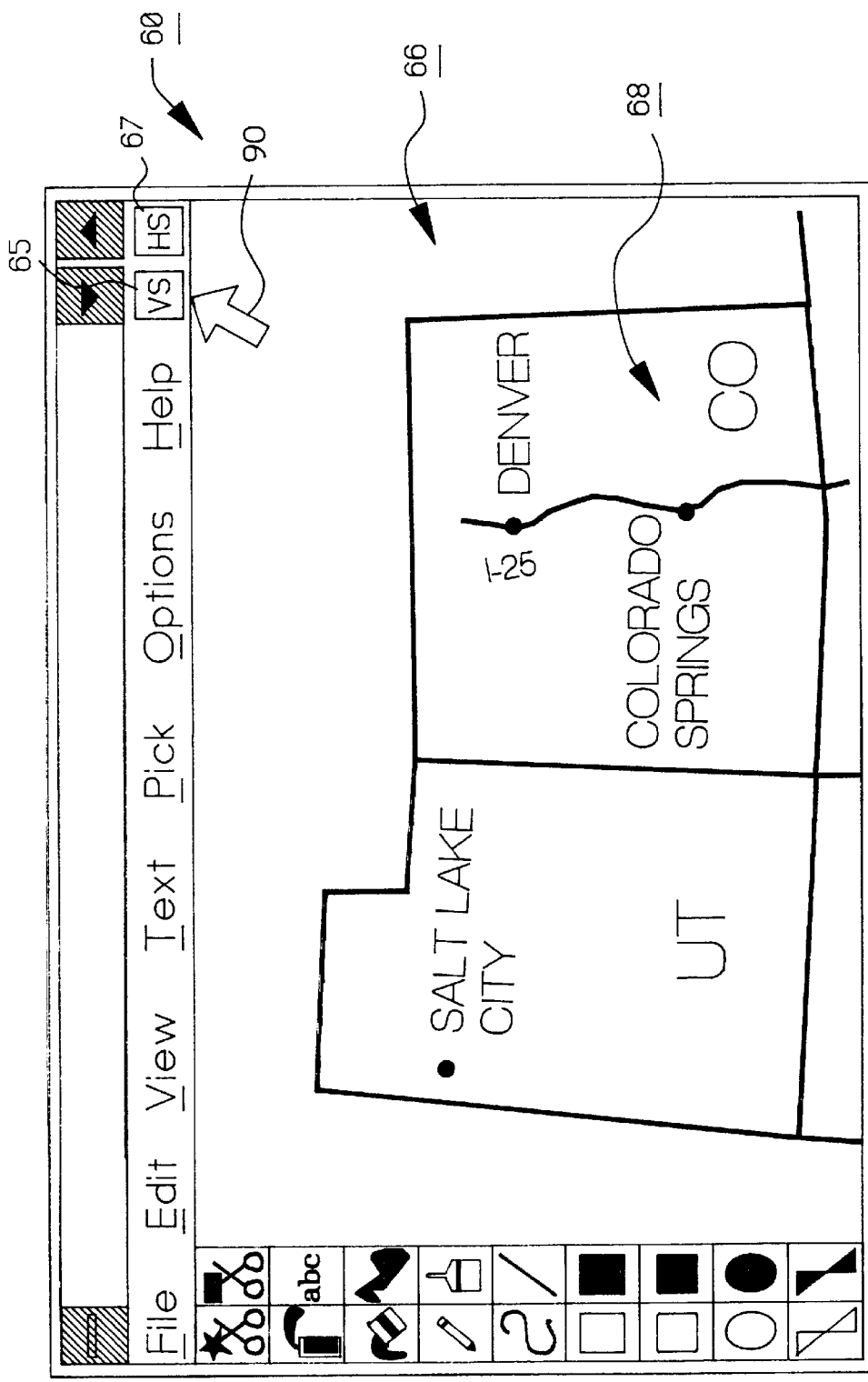
Figure 4:
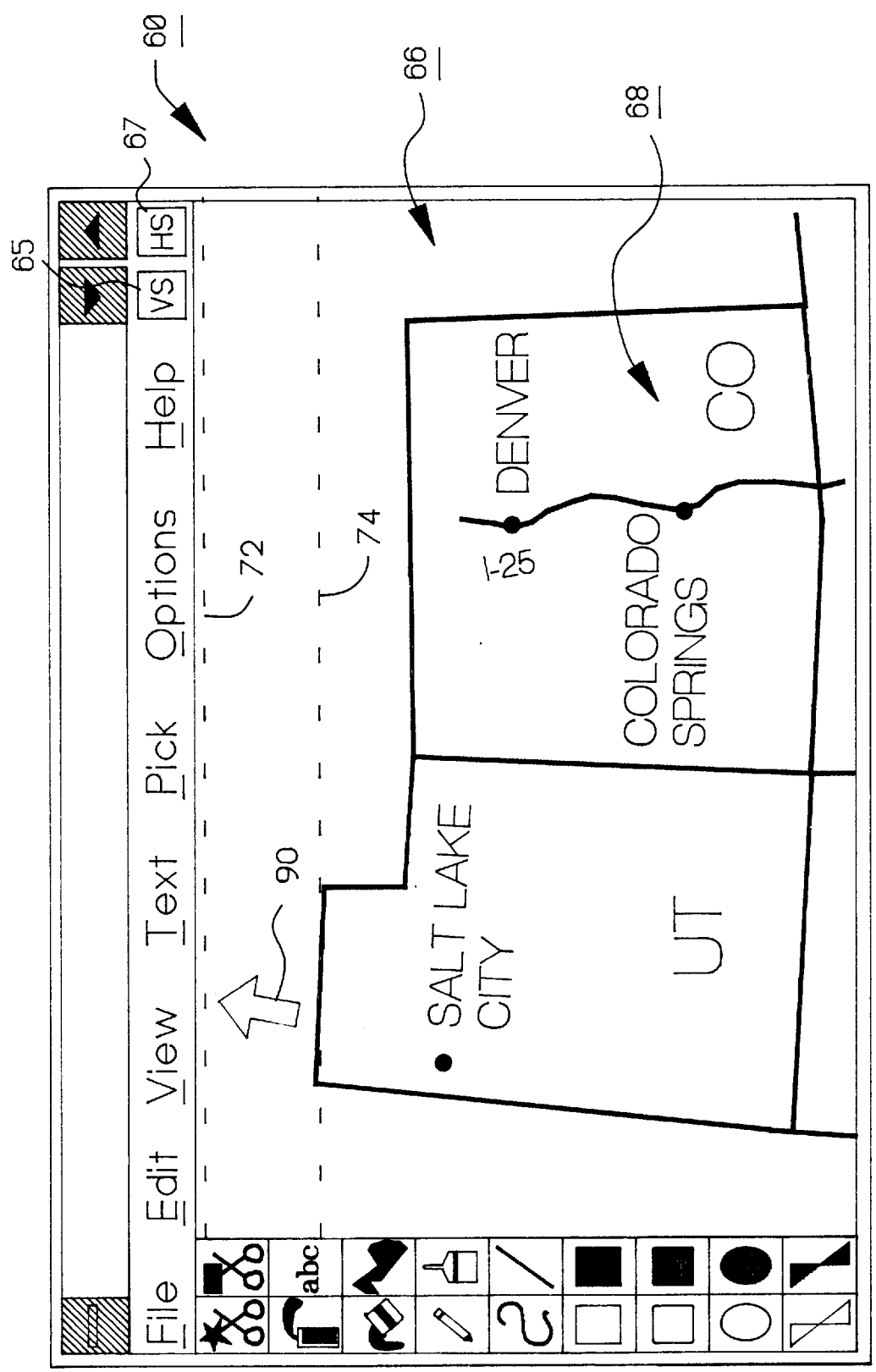

As is shown in FIG. 3, the graphical pointing device 90 may be moved toward a particular one of vertical scroll button 65 and horizontal scroll button 67. FIG. 4 is a pictorial representation of the improved scrolling functionality of the present invention when the horizontal scroll button 67 has been selected. As can be seen, two fine lines 72, 74, are generated within workspace 66 and located adjacent graphical pointing device 90 in order to provide a visually perceptible connection in the graphical user interface 60 to graphical pointing device 90. After clicking, as graphical pointing device 90 is moved leftward and rightward relative to the region bounded by lines 72, 74, the software object 68 is moved within workspace 66. In accordance with the present invention, fine lines 72, 74, are generated in a conventional manner in the monitor of data processing system 10. Preferably, lines 72, 74, are relatively unobtrusive and do not interfere with the operator's view of either graphical user interface 60 or software object 68. Preferably, lines 72, 74, are provided as a faint overlay within workspace 66. In accordance with the present invention, lines 72, 74, provide a visual cue to the operator that the scrolling functionality of the present invention has been engaged.

Figure 5:
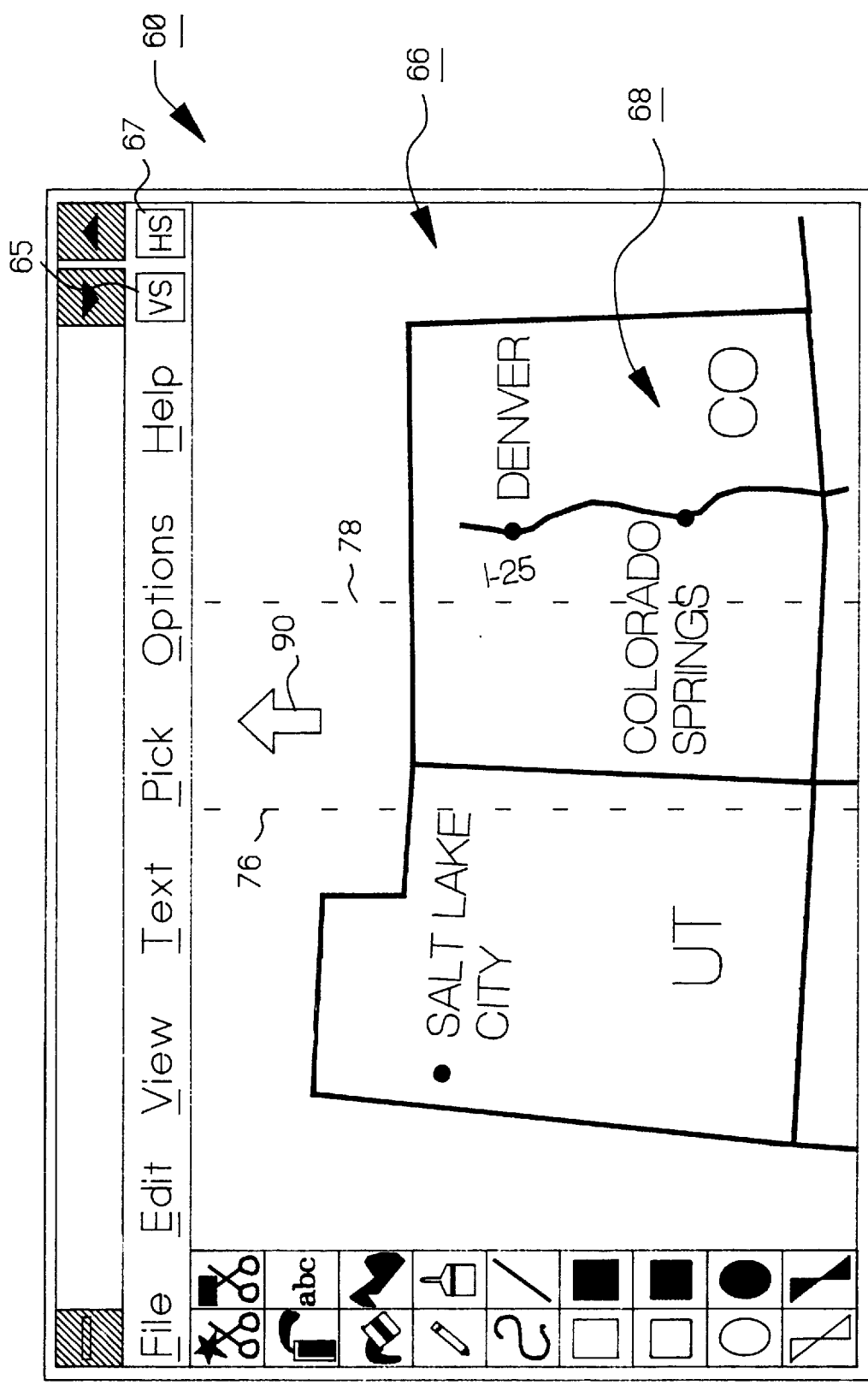

In contrast, FIG. 5 is a pictorial representation of activation of the vertical scrolling functionality of the present invention. As is shown, when the vertical scroll button 65 has been selected by the operator, data processing system 10 generates a visual connection to graphical pointing device 90. Preferably, lines 76, 78, are generated which extend across at least a portion of workspace 66, and are located adjacent graphical pointing device 90. Preferably, as is shown, lines 76, 78 bound each side of graphical pointing device 90. In accordance with the present invention, lines 76, 78 provide a visual cue to the operator that the vertical scrolling functionality has been engaged. After clicking, movement by the operator of the graphical pointing device 90 upward and downward within workspace 66 will scroll the software object 68 through workspace 66. The presence of the faint and unobtrusive lines 76, 78, provide a reminder to the operator that the vertical scrolling functionality has been engaged.

Figure 6:
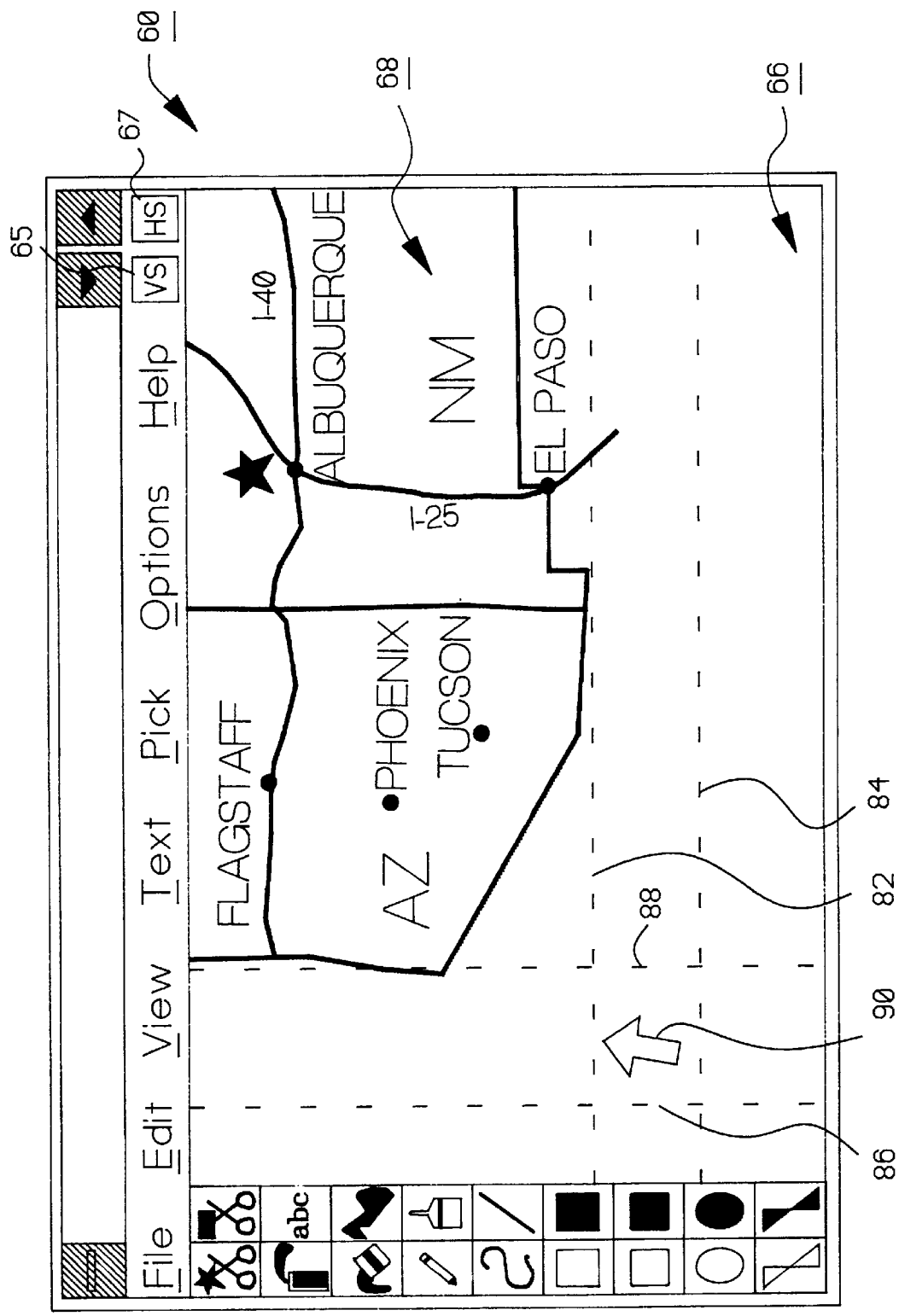

FIG. 6 is a pictorial representation of utilization of the present invention to activate both the horizontal and vertical scrolling functionality. As is shown, graphical pointing device 90 is bound on all sides by visually perceptible connections which extend across at least a portion of workspace 66, and which are relatively unobtrusive and allow for substantially full viewing of workspace 66 and software object 68. As is shown, graphical pointing device 90 is bound on the left side by line 86, on the right side by line 88, above by line 82, and below by line 84. After clicking, as the graphical pointing device is moved upward and downward within workspace 66, the software object 68 is scrolled upward and downward. If, after clicking, graphical pointing device 90 is moved leftward or rightward within workspace 66, then software object 68 is moved leftward or rightward within workspace 66.

In accordance with the present invention, when graphical pointing device 90 is relocated within workspace 66, the visually perceptible connection is dynamically and continuously readjusted to accommodate the relocation of graphical pointing device 90. This provides a continuous visual cue to the operator that the scrolling functionality is still enabled. In accordance with the present invention, this scrolling functionality may be disabled by any predetermined mined user input, such as depression of any particular mouse button or interaction with any novel or conventional graphical user interface component.

Figure 7A:
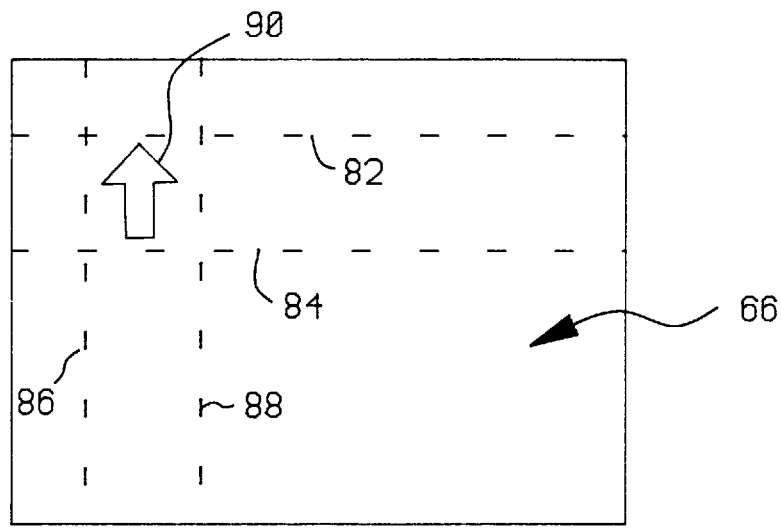
Figure 7B:
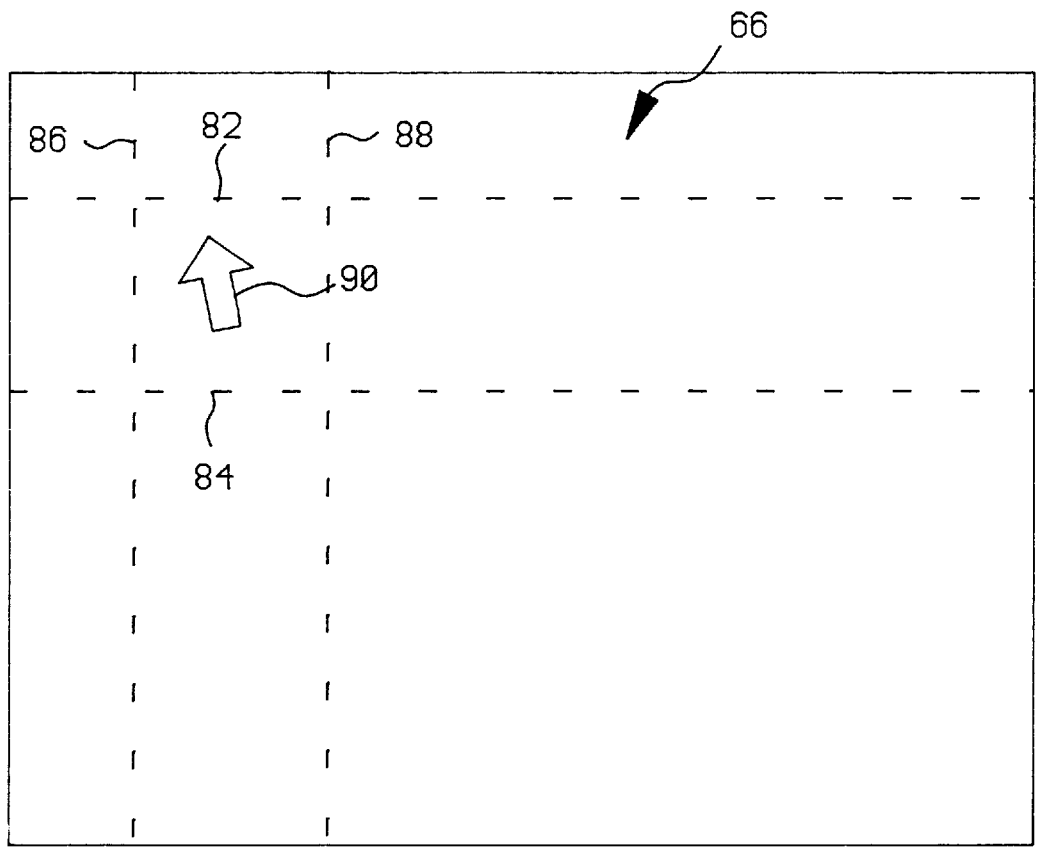

FIGS. 7A and 7B graphically depict an alternative and subordinate feature of the present invention. In accordance with this feature, as the work-space 66 is altered in size (that is, enlarged in size or diminished in size), the spacing between the visual connections is enlarged or diminished in order to provide a visual representation of the relative amount of the software object or workspace that is currently displayed. In other words, the box which is visible around graphical pointing device 90 is relatively small when a relatively small portion of the software object or workspace is being displayed. This is visually represented in FIG. 7A, wherein graphical pointing device is surrounded by a box defined by lines 82, 84, 86, and 88. When the workspace 66 is enlarged (such as, when it is "maximized"), the "box" about graphical pointing device 90 which is defined by lines 82. 84, 86, and 88 is enlarged to provide a visual cue that a larger amount of the software object or workspace is in view within workspace 66.

Figure 8A:
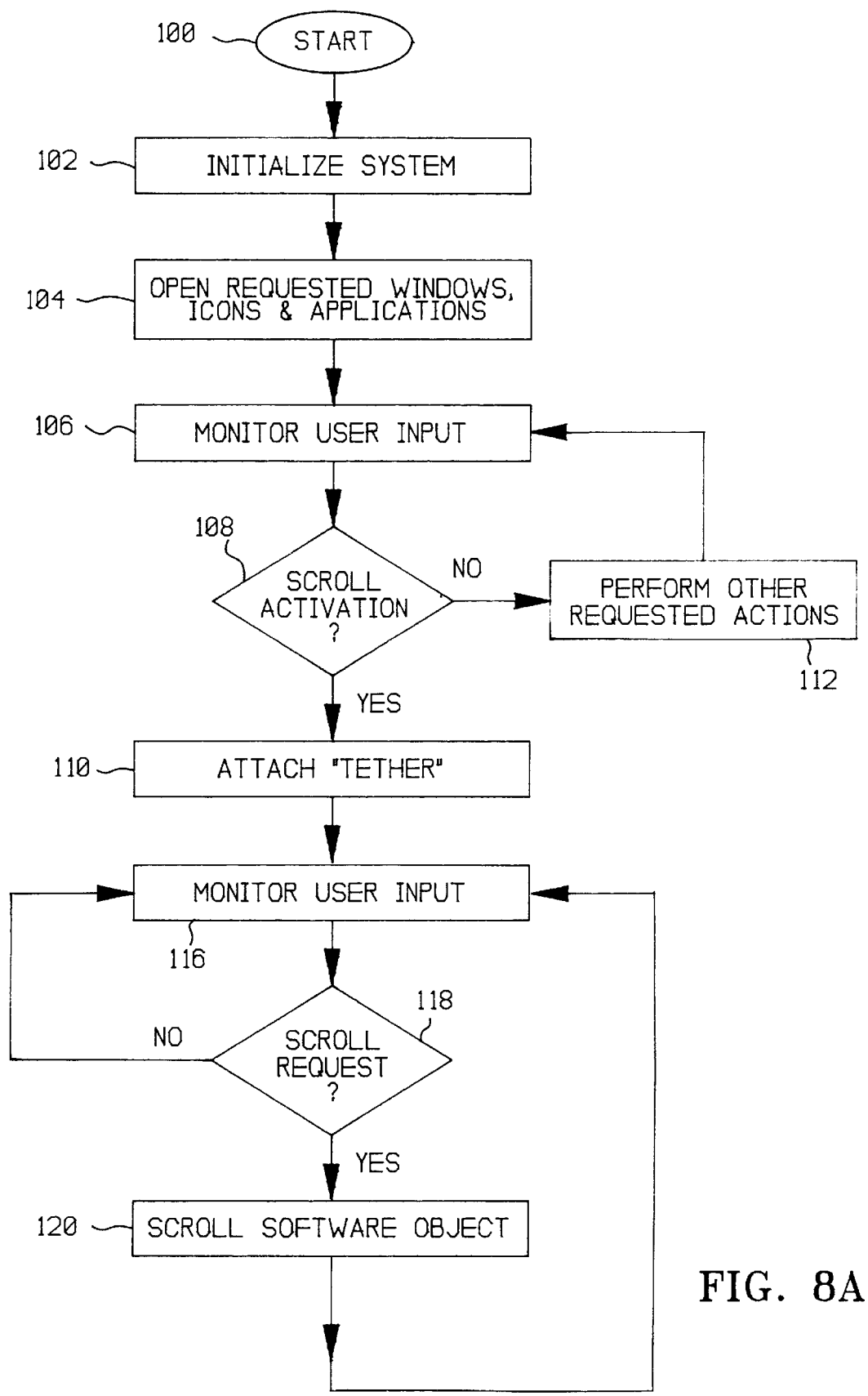
FIGS. 8A through 8C are flowchart representations of a computer program implementation of the method and apparatus for improved scrolling functionality of the present invention.
Figure 8B:
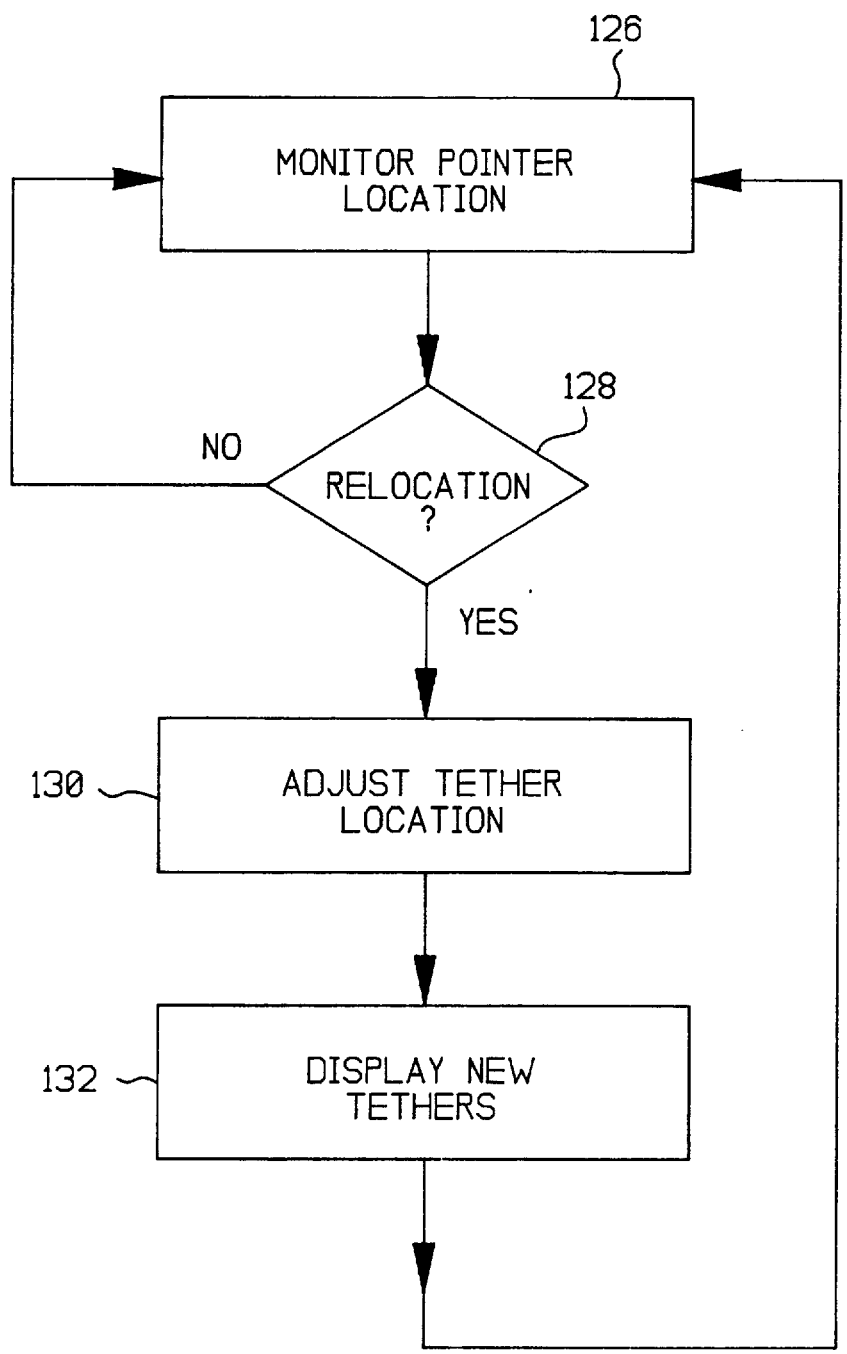

FIGS. 8A and 8B depict in flowchart form the preferred computer program operations which are required to implement the present invention. With reference first to FIG. 8A, the process starts at software block 100, and continues at software block 102 in which the data processing system 10 is initialized, in accordance with conventional techniques. The process continues in software block 104, wherein routines for requested windows, and corresponding icons, as well as requested applications are opened by the data processing system 10. In block 106, user input is monitored to determine if a scroll function actuation is requested. If the data processing system 10 determines that a scroll function is not requested, other requested actions are performed, as is set forth in software block 112.

if, however, a scroll actuation function is requested in software block 108, the process continues in block 110, wherein a software tether is generated and displayed on video display 14 of data processing system 14 of data processing system 10, In accordance with software block 116, user input is monitored in workspace 32, in order to determine if a "scroll" is requested. Either left button 24 or right button 26 may be used to "click" mouse 20, thus initiating the scrolling functionality 36. Software block 118 represents the monitoring and detection of a request for scrolling.

When the scroll functionality is no longer desired, either left button 24 or right button 26 may be used to "click" mouse 20, in a predetermined manner, in order to disable the scrolling functionality and to remove the software "tethers".

FIG. 8B depicts the software routines utilized by the present invention in order to accommodate relocation of graphical pointing device 90 within graphical user interface 60. The process begins at software block 126 wherein data processing system 10 monitors user input to determine pointer location. In accordance with software block 128, data processing system 10 monitors for relocation; if no relocation is detected, control returns to software block 126; however, if relocation occurs, control passes to software block 130 wherein program instructions are utilized to adjust the tether location to accommodate the new location of the graphical pointing device. Next, in accordance with software block 132, the new tethers are displayed in the visual display of data processing system 10. In accordance with the preferred embodiment of the present invention, the readjustment of the tethers is dynamically performed in order to create the illusion of a continuous and adjustable tethering between the selected scroll bar and the graphical pointing device 90.

Figure 8C:
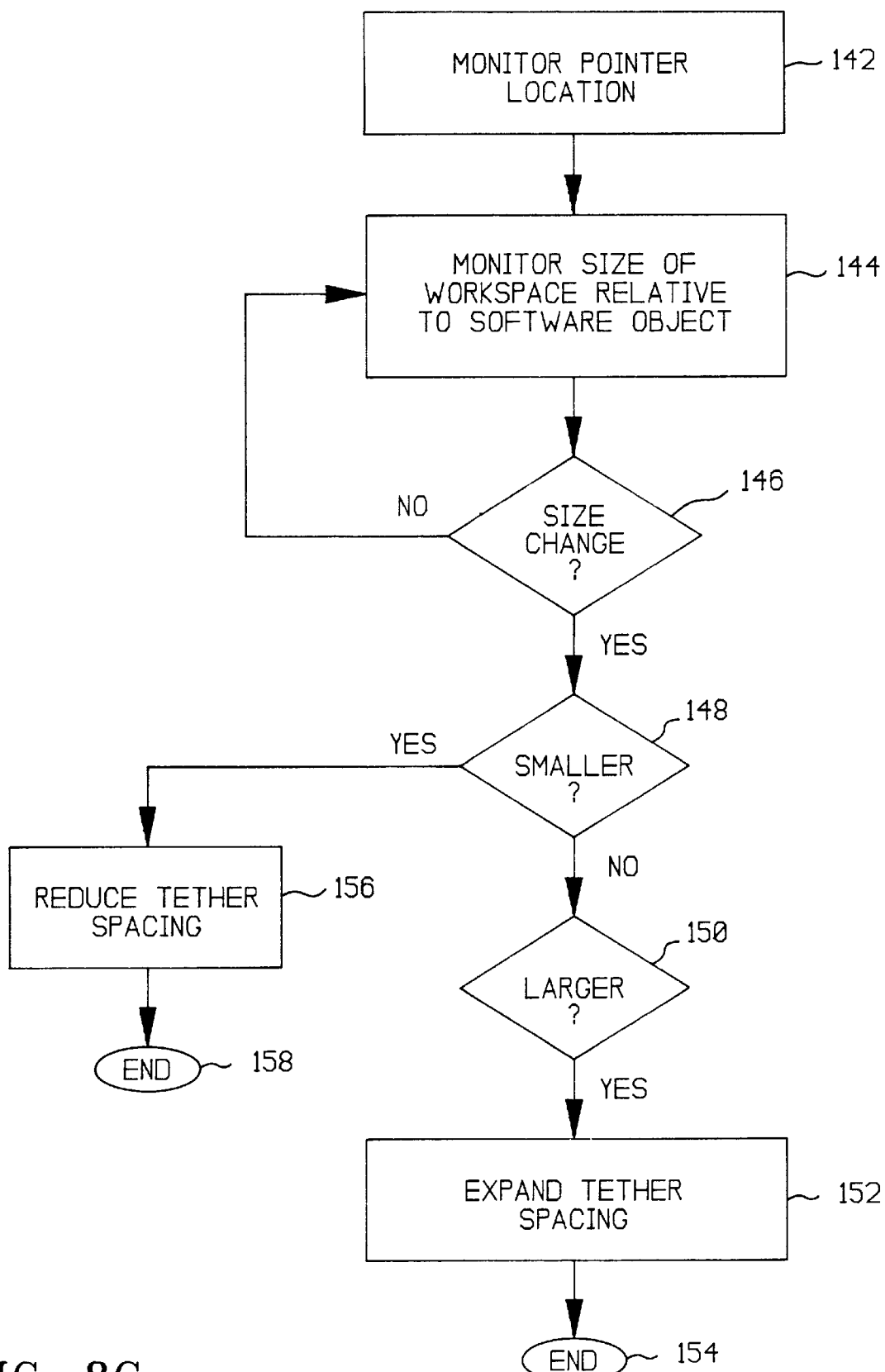

FIG. 8C is a flowchart representation of the software being utilized in order to automatically adjust the visual connections relative to the graphical pointing device 90 in order to provide a visual cue to the operator that a larger or smaller portion of the software object or workspace is on display within the graphical user interface. The process begins at software block 142, where data processing system 10 is utilized to monitor pointer location. Next, in accordance with software block 144, the data processing system 10 is utilized to monitor the size of the workspace relative to the software object. For example, data processing system 10 is utilized to monitor for any automatic or user-initiated change in size of the workspace 66 which would affect the amount of the software object on display. In accordance with software block 146, data processing system 10 monitors to determine if such a size change occurs; if no size change occurs, control is returned to software block 144; however, if a size change is detected, control passes to software block 148. In accordance with software block 148, data processing system 10 determines whether the workspace has been sized downward; if so, control passes to software block 156; if not, control passes to software block 150. In accordance with software block 156, data processing system 10 automatically reduces the tether spacing in order to accommodate the diminution in the amount which the software object is visible within the workspace, and the process ends at step 158. If control passes to software block 150, data processing system 10 monitors to determine whether the size change results in an enlargement of the amount of the software object visible within the workspace; if so, control passes to software block 152, wherein the tether spacing is expanded, and the process ends at software block 154.

While the preferred embodiment of the present invention provided herein contemplates a replacement of conventional scroll bars, the present invention for improved scrolling functionality can be utilized in combination with a graphic user interface that includes conventional scroll bars in order to supplement the conventional scroll bars.

What is claimed is:

1. A method in a graphical user interface of a data processing system, including at least particular work space, for providing an indication of selected scrolling functionality, comprising the data processing implemented steps of:

(a) providing a scroll bar activation function which initiates scroll bar functionality after predefined interaction of a graphical pointing device associated with said data processing system and said graphical user interface;

(b) monitoring for interaction between said graphical pointing device and said graphical user interface which satisfies said scroll bar activation function;

(c) after detection of satisfaction of said scroll bar activation function, associating said scroll bar functionality with said graphical pointing device; and (d) visually representing said association of said scroll bar functionality with said graphical pointing device with a pair of generally parallel, relatively thin, nonobtrusive lines extending entirely across said at least one particular work space and bounding said graphical pointing device within said at least one particular work space;

(e) monitoring for relocation of said graphical pointing device within a region of said at least one particular workspace bounded by said pair of generally parallel, relatively thin, nonobtrusive lines; and (f) scrolling, in a predefined manner, through a software object maintained in said at least one particular work space upon detection of relocation of said graphical pointing device.

2. A method according to claim 1:
wherein said scroll bar functionality comprises a horizontal scroll bar functionality and a vertical scroll bar functionality;
wherein said visually perceptible connection comprises a pair of generally parallel, relatively thin, nonobtrusive lines extending horizontally across said at least one particular work space bounding said graphical pointing device, and a pair of generally parallel relatively thin nonobtrusive lines extending vertically across said at least one particular work space bounding said graphical pointing device.

3. A data processing system for providing an indication of selected scrolling functionality, comprising:

(a) means for providing at least one work space in a graphical user interface;

(b) means for providing a graphical pointing device;

(c) a scroll bar activation routine which initiates scroll bar functionality after detection of a predefined interaction of said graphical pointing device and said graphical user interface;

(d) means for monitoring for interaction between said graphical pointing device and said graphical user interface which satisfies said scroll bar activation routine;

(e) means for associating said at least one scroll bar functionality with said graphical pointing device after detection of satisfaction of said scroll bar activation routine;

(f) means for visually representing said association of said at least one scroll bar functionality with said graphical pointing device with a visually perceptible connection in said graphical user interface to said graphical pointing device, including:
  (1) a pair of generally parallel, relatively thin, nonobtrusive lines, extending entirely across said at least one workspace, and bounding said graphical pointing device.

4. A data processing according to claim 3, further comprising:

(g) means for monitoring for relocation of said graphical pointing device relative to said pair of generally parallel, relatively thin, nonobtrusive lines; and (h) means for scrolling a software object, in a predefined manner, in response to detection of relocation of said graphical pointing device relative to said pair of generally parallel, relatively thin, nonobtrusive lines.

5. A data processing system according to claim 3:
wherein said at least one scroll bar functionality comprises at least one horizontal scroll bar functionality and a vertical scroll bar functionality;
wherein said visually perceptible connection comprises a pair of relatively thin nonobtrusive lines extending horizontally across at least a portion of said at least one workspace and bounding said graphical pointing device, and a pair of generally parallel, relatively thin nonobtrusive lines extending vertically across at least a portion of said at least one work space and bounding said graphical pointing device.

6. A method in a graphical user interface of a data processing system for providing an indication of selected scrolling functionality, comprising the data processing implemented steps of:

(a) receiving and processing data processing instructions which generate a work space in said graphical user interface;

(b) receiving and processing instructions which generate a graphical pointing device in said graphical user interface;

(c) receiving and processing data processing instructions which provide a scroll bar activation function which initiates scroll bar functionality after detection of a predefined interaction of said graphical pointing device and said graphical user interface;

(d) utilizing said data processing system for monitoring for interaction between said graphical pointing device and said graphical user interface which satisfies said scroll bar activation function;

(e) after detection of satisfaction of said scroll bar activation function, receiving and processing data processing instructions for associating at least one scroll bar functionality with said graphical pointing device; and (f) receiving and processing data processing instructions for visually representing said association of said at least one scroll bar functionality with said graphical pointing device with a visually perceptible connection in said graphical user interface which extends across at least a portion of said work and is adjacent said graphical pointing device which includes a pair of generally parallel, relatively thin, nonobtrusive lines extending entirely across said at least one particular wore space which bound said graphical pointing device.

7. A method according to claim 6, further comprising:

(g) monitoring for relocation of said graphical pointing device relative to said pair of generally parallel, relatively thin, nonobtrusive lines; and (h) receiving and processing data processing instructions for scrolling a software object maintained in said work space in response to detected relocation of said graphical pointing device.

8. A method according to claim 6:
wherein said at least one scroll bar functionality comprises a horizontal scroll bar functionality and a vertical scroll bar functionality;
wherein said visually perceptible connection comprises a pair of generally parallel, relatively thin nonobtrusive lines extending horizontally toward, and bounding, said graphical pointing device, and a pair of generally parallel relatively thin nonobtrusive lines extending vertically toward, and bounding, said graphical pointing device.

9. A method in a graphical user Interface of a data processing system, including at least particular work space with a software object located therein, for providing an indication of selected scrolling functionality, comprising the data processing implemented steps of:

(a) providing a scroll bar activation function which initiates scroll bar functionality after predefined interaction of a graphical pointing device associated with said data processing system and said graphical user interface;

(b) monitoring for interaction between said graphical pointing device and said graphical user Interface which satisfies said scroll bar activation function;

(c) after detection of satisfaction of said scroll bar activation function, associating said scroll bar functionality with said graphical pointing device;

(d) providing a visually perceptible representation of said scroll bar functionality adjacent said graphical pointing device including a pair of generally parallel, relatively thin, nonobtrusive lines extending entirely across said at least one particular work apace which bound said graphical pointing device; and (e) automatically adjusting the size of said visually perceptible representation to provide a visual indication of the relative portion of said software object which is currently visible in said at least one particular workspace.

10. A method according to claim 9, further comprising:

(e) monitoring for relocation of said graphical pointing device relative to said pair of generally parallel, relatively thin, nonobtrusive lines; and (f) scrolling said software object in response to detected relocation.

11. A data processing system for providing an indication of selected scrolling functionality, comprising:

(a) means for providing at least one work space in a graphical user interface;

(b) means for providing a graphical pointing device;

(c) a scroll bar activation routine which initiates scroll bar functionality after detection of a predefined interaction of said graphical pointing device and said graphical user interface;

(d) means for monitoring for interaction between said graphical pointing device and said graphical user interface which satisfies said scroll bar activation routine;

(e) means for associating said at least one scroll bar functionality with said graphical pointing device after detection of satisfaction of said scroll bar activation routine;

(f) means for providing a visually perceptible representation of said scroll bar functionality adjacent said graphical pointing device including a pair of generally parallel, relatively thin, nonobtrusive lines extending entirely across said at least one particular work space which bound said graphical pointing device; and (e) means for automatically adjusting the size of said visually perceptible representation to provide a visual indication of the relative portion of said software object which is currently visible in said at least one particular workspace.

* * * * *

UNITED STATES PATENT AND TRADEMARK OFFICE
CERTIFICATE OF CORRECTION

PATENT NO. : 5,874,957
DATED : Feb. 23, 1999
INVENTOR(S) : *Cline et al.*

It is certified that error appears in the above-identified patent and that said Letters Patent is hereby corrected as shown below:

In col. 5, line 37, please change "if," to --If,--.

Signed and Sealed this

Twenty-third Day of November, 1999

Attest:

Q. TODD DICKINSON

*Attesting Officer*  *Acting Commissioner of Patents and Trademarks*